United States Patent [19]

Wikelski et al.

[11] 3,756,611
[45] Sept. 4, 1973

[54] PACKING RETAINER CUP

[75] Inventors: Karl W. Wikelski; Henry K. Tyson, both of Odessa, Tex.

[73] Assignee: Dart Industries Inc., Los Angeles, Calif.

[22] Filed: July 15, 1971

[21] Appl. No.: 162,915

[52] U.S. Cl.............................. 277/194, 277/124
[51] Int. Cl........................... F16j 15/56, F16j 15/16
[58] Field of Search..................... 277/194, 27, 157, 277/124, 22, 75, 68, 198

[56] References Cited
UNITED STATES PATENTS

| | | | |
|---|---|---|---|
| 3,048,411 | 8/1962 | Waibel............................ | 277/22 X |
| 3,325,173 | 6/1967 | Alt.................................. | 277/68 X |
| 3,490,774 | 1/1970 | Henry et al..................... | 277/71 X |

*Primary Examiner*—Samuel B. Rothberg
*Attorney*—Richard A. Dannells, Jr.

[57] ABSTRACT

An improved packing retainer cup is provided having an increased operational life span which comprises a retaining ring having first and second radially extending side walls and inner and outer circumferential surfaces, an inner peripheral recess in said first side wall communicating with said inner circumferential surface for receiving a sealing ring, the sealing face of said first side wall extending continuously uninterrupted from the recess to the outer circumferential surface, and an outer peripheral undercut in said second side wall communicating with said outer circumferential surface, the sealing face of the second side wall extending continuously uninterrupted from said inner circumferential surface to said undercut.

7 Claims, 5 Drawing Figures

PATENTED SEP 4 1973 3,756,611

INVENTORS.
KARL W. WIKELSKI
HENRY K. TYSON
BY
Ronald J. Carlson
ATTORNEY

PACKING RETAINER CUP

DISCLOSURE

This invention relates to an improved packing retainer cup for use in reciprocating piston type compressors used for compressing gases to a high pressure.

In reciprocating type compressors of the plunger type there are provided a plurality of pressure sealing assemblies fixedly mounted within a casing surrounding the reciprocating plunger and serving to provide a gas tight seal. Each assembly comprises a packing retainer cup having a cut-out area or recess on its inner surface in which a packing ring is disposed. These pressure sealing assemblies are mounted within the casing in parallel and are clamped in place under high compression to provide a gas tight seal between each assembly. Furthermore, the pressure differential between the inner surface and the outer surface of the retainer cup produces significant radial and tangential stresses on the retainer cup. It has been found that the packing retainer cups heretofore employed have had a relatively short life span and must be frequently replaced apparently due to fatigue caused by the high cyclic stresses to which they are subjected during use.

In accordance with this invention there is provided a packing retainer cup having improved features of endurance strength and fatigue life which enable it to be used in high pressure compressors for substantially longer periods of time than presently known packing retainer cups. Briefly, the improved packing retainer cup of this invention comprises a retaining ring having first and second radially extending side walls with sealing faces and inner and outer circumferential surfaces, an inner peripheral recess in said first side wall communicating with said inner circumferential surface for receiving a sealing ring, the sealing face of said first side wall extending continuously uninterrupted from said recess to said outer circumferential surface, and an outer peripheral undercut in said second side wall communicating with said outer circumferential surface, the sealing face of said second side wall extending continuously uninterrupted from said inner circumferential surface to said undercut. Broadly, the retaining ring may be of a unitary construction or of multiple concentric rings, e.g., two or three rings, etc., defining the above construction.

The invention and the manner in which it distinguishes from the prior art will be apparent from the following description and the drawings wherein.

Figure 1:
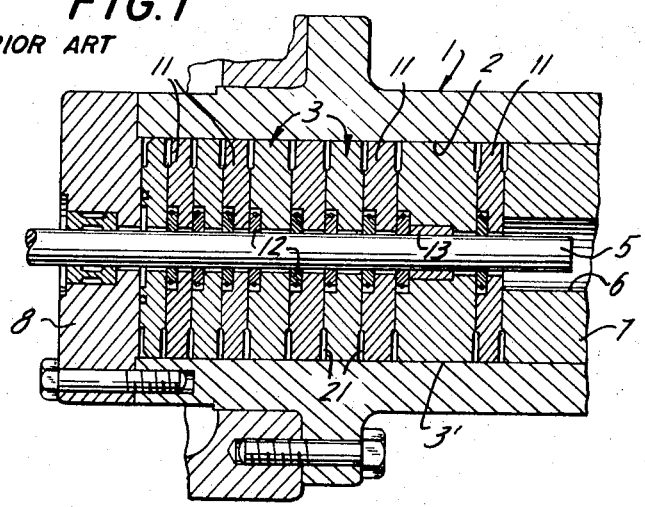
FIG. 1 is a longitudinal section of a high pressure compressor cylinder employing packing retainer cups of the prior art.

With reference to FIG. 1, there is illustrated a conventional high pressure compressor cylinder comprising, in general, a casing 1 having a central bore 2 housing a plurality of typical pressure sealing assemblies 3 which surround a reciprocating plunger 5. The free end of the plunger reciprocates in a compression chamber 6 formed in a cylinder 7 mounted in one end of the bore 2. A conventional cap member 8 is mounted at the opposite end of the bore and bolted to the casing 1. The cap essentially serves to clamp the pressure sealing assemblies 3 against each other and against the cylinder 7 which in turn is held in place by a cylinder head (not shown) to form gas tight seals at their interfaces.

Each pressure sealing assembly 3 comprises a packing retainer cup 11 and a sealing ring 12. The sealing rings are in sealing engagement with the reciprocating plunger to prevent rearward flow of gas from the cylinder 7. An intermediate pressure sealing assembly 3' is additionally provided with a wear sleeve 13, preferably of bronze or similar metal, for positioning and guiding the plunger in its reciprocating movement.

Figure 2:
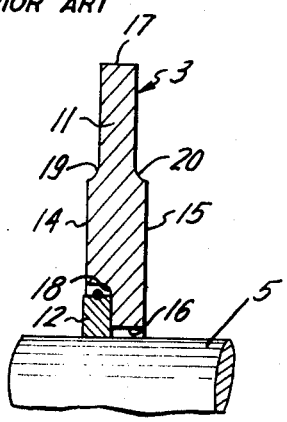
FIG. 2 is an enlarged isolated view of a partial cross section of a prior art packing retainer cup as shown in FIG. 1.

Referring to FIG. 2 the pressure sealing assembly 3 is illustrated in greater detail. In these typical prior art assemblies the packing retainer cup 11 comprises first and second radially extending side walls 14 and 15, respectively, and inner circumferential surface 16 and an outer circumferential surface 17. An inner peripheral recess 18 is provided in first side wall 14 communicating with the inner circumferential surface 16 for receiving the sealing ring 12. Both side walls 14 and 15 are undercut in the regions adjacent the outer circumferential surface so that the sealing face of the first side wall 14 extends continuously uninterrupted from the recess 18 to the undercut 19 of the first side wall and the sealing face of the second side wall 15 extends continuously uninterrupted from the inner circumferential surface 16 to the undercut 20 of the second side wall.

Among the purposes served by the undercuts 19 and 20 of the retaining ring 11 are included the formation of passageways through which a coolant may be flowed when the packing retainer cups 11 are assembled in place in the compressor cylinder and to reduce the overall load or pressure which must be applied to the packing retainer cups to perfect a gas tight seal between the adjacent faces of the packing retainer cups. All of this is perhaps more easily understood by reference to FIG. 1 wherein the packing retainer cups are shown mounted in place with passageways 21 being formed between each packing retainer cup 11. It will be understood by those skilled in the art that the undercuts also serve to reduce the total surface area of the sealing faces of the packing retainer cups and thus reduce the total load or pressure which must be applied to the packing retainer cups to obtain a gas tight seal. In the prior art packing retainer cup shown in FIGS. 1 and 2 it is apparent that the smallest area sealing face, the one provided on side wall 14 extending from the recess 18 to the undercut 19, controls the value of the total load requirement.

As mentioned previously these typical prior art packing retainer cups have had relatively short life spans. One of the contributing factors for this short life span is fatigue failure along the plane of greatest stress concentration, namely the smallest area sealing face. In the prior art packing retainer cups this stress concentration appears along the sealing face of side wall 14.

Figure 3:
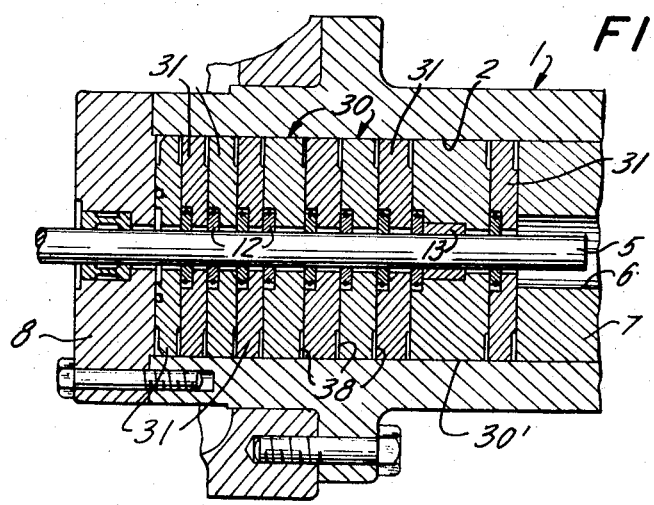
FIG. 3 is a longitudinal section of a high pressure compressor employing packing retainer cups in accordance with this invention.
Figure 4:
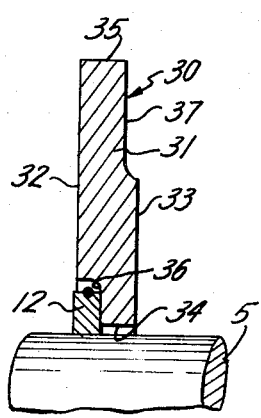
FIG. 4 is an enlarged isolated view of a partial cross section of a packing retainer cup of this invention as shown in FIG. 3.

Now then, with reference to FIG. 3 there is shown substantially the same conventional high pressure compressor cylinder as shown in FIG. 1 except that the packing retainer cup of this invention is shown in place of the previously described prior art packing retainer cup. FIG. 4 more clearly illustrates the basic differences in construction of the packing retainer cups. Briefly, the packing retainer cup of this invention is provided with but a single undercut and this appears on the side wall opposite the recess for the sealing ring.

As shown in FIG. 3, the compressor cylinder is shown with those elements which are identical to the corresponding elements of FIG. 1 bearing the same reference numbers. As apparent, the compressor cylinder is provided in this instance with pressure sealing assemblies 30 each comprising the packing retainer cup 31 of this invention and a conventional sealing ring 12. An intermediate pressure sealing assembly 30' is additionally provided with a wear sleeve 13.

For further detail of the packing retainer cup 31, referring to FIG. 4, it will be seen that there are provided first and second radially extending side walls 32 and 33, respectively, an inner circumferential surface 34, an outer circumferential surface 35, and an inner peripheral recess 36 appearing in the first side wall 32 and communicating with the inner circumferential surface 34 for receiving the sealing ring 12. An undercut 37 is provided in the region of the side wall 33 adjacent the outer circumferential surface 35 so that the sealing face of side wall 33 extends continuously uninterrupted from the inner circumferential surface 34 to the undercut 37. The depth of the undercut 37 should not be so great as to intersect or overlap an imaginary radial line extending outward from the inner wall of the recess 36. The opposite sealing face of side wall 32, on the other hand, extends continuously uninterrupted from the recess 36 to the outer circumferential surface 35.

Thus, relative to the prior art, when these packing retainer cups are installed there is still provided a passageway 38 between each adjacent cup for circulation of a coolant while the plane of greatest stress concentration has been transferred to the sealing face of side wall 33 opposite from the recess 36. It is pointed out that since this sealing face is of larger surface area the stress concentration is lower than that encountered with the previously described prior art packing retainer cup. This result is obtained while the total load or pressure which must be applied to perfect a gas tight seal between the packing retainer cups is maintained the same.

With the packing retainer cups of this invention the life span of the pressure sealing assembly is significantly improved thus requiring fewer shut-downs of the compressor equipment for maintenance and replacement of pressure sealing assembly parts.

Figure 5:
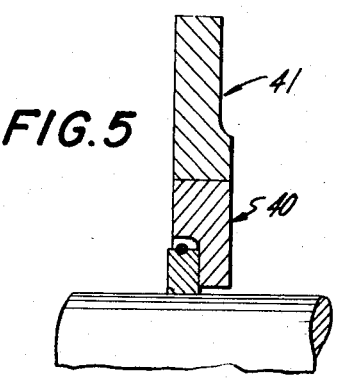
FIG. 5 is an enlarged isolated view of a partial cross section of another embodiment of a packing retainer cup of this invention.

As indicated previously, the packing retainer cup of this invention may be formed by multiple concentric rings as well as of unitary construction. The unitary construction has been described above with reference to FIGS. 3 and 4. In FIG. 5 there is shown a concentric two-ring construction comprising an inner ring 40 and an outer ring 41 which together form the same exterior construction features of the unitary embodiment. This multiple ring construction is oftentimes employed to pre-stress certain portions of the packing retainer cup as is well known in the art. Another feature of this invention relates to a packing retainer cup of the multiple concentric ring type wherein the rings have been pre-stressed in a manner wherein the inner circumferential edge of the innermost ring, which edge corresponds to that radially extending side wall having the smallest facial area, is at about zero net tangential stress under operational pressures. This, in effect, reduces the total stress at the weakest region of the packing retainer cup and further lengthens the operational life.

Thus having described the invention in detail it will be understood by those skilled in the art that certain modifications and variations may be made without departing from the spirit and scope of the invention as defined herein and in the appended claims.

We claim:

1. A packing retainer cup having first and second radially extending side walls and inner and outer circumferential surfaces, an inner peripheral recess in said first side wall communicating with said inner circumferential surface for receiving a sealing ring, the sealing face of said first side wall extending continuously uninterrupted from the recess to the outer circumferential surface, and an outer peripheral undercut in said second side wall communicating with said outer circumferential surface, the sealing face of the second side wall extending continuously uninterrupted from said inner circumferential surface to said undercut.

2. A packing retainer cup according to claim 1 wherein the depth of the undercut does not intersect or overlap an imaginary radial line extending outward from the inner wall of the recess.

3. A packing retainer cup according to claim 1 wherein there is additionally provided a cut-out region in the inner circumferential surface for receiving a wear sleeve.

4. A packing retainer cup comprising multiple concentric rings which together form the construction defined in claim 1.

5. In a high pressure compressor having a cylinder, a plunger and a plurality of pressure sealing assemblies surrounding the plunger to prevent the rearward flow of gas from the cylinder, each of said assemblies including a packing retainer cup and a packing ring, the improvement therein wherein each packing retainer cup is as defined in claim 1.

6. The invention according to claim 5 wherein the packing retainer cup comprises multiple concentric rings which together form the construction defined in claim 1.

7. The invention according to claim 6 wherein the multiple concentric rings are pre-stressed.

* * * * *